2,913,492
SELECTIVE FORMIC ACID REMOVAL

Henricus G. P. van der Voort, Amsterdam, Netherlands, assignor to Shell Development Company, New York, N.Y., a corporation of Delaware No Drawing. Application February 13, 1958
Serial No. 714,945

Claims priority, application Netherlands
February 18, 1957

7 Claims. (Cl. 260—541)

This invention relates to the selective removal of formic acid from mixtures comprising formic acid in admixture with organic components. The invention relates more particularly to improvements in the selective catalytic decomposition of the formic acid content of mixtures containing formic acid in admixture with organic components comprising acetic acid and/or hydrocarbons.

Formic acid-containing mixtures which contain the formic acid in admixture with organic components are often unavoidably formed in many important chemical processes. Such mixtures include those containing formic acid in admixture with one or more components, for example: hydrocarbons, as the lower boiling aliphatic hydrocarbons; oxygen-containing organic components, as acetic acid; water; etc. Mixtures containing formic acid in admixture with oxygen-containing organic components such as acetic acid, are obtained for example when oxidizing acetaldehyde to acetic acid; oxidizing alkyl benzenes with molecular oxygen to phthalic acids; etc. The latter type of operations include the oxidation of meta- and para-diisopropyl benzene, in the presence of acetic acid as solvent, to isophthalic and terephthalic acid, respectively. In these processes it is generally required to effect the removal of at least a part of the formic acid from by-product mixtures containing it in admixture with acetic acid. In some cases the formic acid removal must be carried out to enable the recovery of a desired organic component admixed therewith as a pure product. In other cases it is essential to effect the selective removal of the formic acid to permit the recycling of an organic component admixed therewith, for example acetic acid, back to the reaction in the absence of any substantial amount of formic acid. Removal of the formic acid from such mixtures by methods relying primarily upon a distillation operation requires a plurality of complex operative steps and extensive apparatus which materially increases the cost of the process. The problem is aggravated by the fact that the mixtures treated are of corrosive nature, and therefore necessitate the use of costly non-corrosive materials of construction in such distillation equipment.

Methods have been disclosed heretofore directed to removal of formic acid from an organic mixture by decomposition. U.S. Patent 2,656,379 describes a method wherein a mixture containing formic and acetic acids is passed over activated alumina at temperatures above 260° C. Russian Patent 57,862 (referred to in C 1941 I, 1738 and C.A. 38, 5227 (1944)), discloses passing a mixture containing formic and acetic acids over a dehydrogenation catalyst at temperatures above 300° C. Processes disclosed heretofore, however, generally possess the distinct disadvantage that in order to obtain any appreciable decomposition of the formic acid therein, the mixture must be subjected to elevated temperatures at which substantial decomposition of the acetic acid is unavoidably encountered. It has been found that to avoid any substantial decomposition of acetic acid it must be maintained below 200° C. However, at these temperature conditions the processes disclosed heretofore are usually ineffective in obtaining a practical degree of selective formic acid decomposition.

It has now been found that at least a substantial part of the formic acid content of a mixture, containing the formic acid in admixture with organic components comprising acetic acid and/or hydrocarbons, is selectively decomposed in the absence of any substantial acetic acid decomposition, by contacting the mixture in the vapor phase, in the absence of any substantial amount of oxygen, at a temperature of from about 130° to 200° C., with a catalyst containing as the essential catalytic ingredients a mixture of chromium oxide and copper oxide in which the atomic ratio of copper to chromium is in the range of from about 1:1 to about 1:2.

Formic acid-containing mixtures treated in accordance with the invention comprise any of the formic acid-containing organic mixtures comprising the formic acid in admixture with at least one of the components: oxygen-containing organic compounds such as acetic acid, hydrocarbons such as the lower boiling aliphatic and aromatic hydrocarbons, and water. The mixtures treated may comprise components ordinarily encountered in commercially available mixtures of this type. Such additional components may comprise those which may or may not undergo reaction during the course of the process without, however, adversely affecting the selective formic acid decomposition. The invention is not limited with respect to the formic acid content of the mixtures treated. It is, however, employed with particular advantage in the processing of mixtures comprising the formic acid in admixture with acetic acid and/or hydrocarbons and/or water, wherein the formic acid content ranges from about 0.5 to about 25%. The process is of particular value in removing formic acid from acetic acid-containing recycle streams in processes wherein alkyl-substituted benzenes are oxidized to aromatic carboxylic acids in the presence of carboxylic acid solvents such as acetic acid.

The catalysts employed to effect the selective decomposition of formic acid in accordance with the invention consists essentially of mixtures of chromium oxide and copper oxide in which the atomic ratio of chromium to copper is in the range of from about 0.5 to about 1. The catalyst may also contain a minor amount of one or more metals or oxides capable of promoting the reaction. Such suitable materials include the alkaline earth metals and their oxides. Particularly desirable as a minor component of the catalyst is the oxide of barium. Suitable catalysts may contain an atomic ratio of barium to copper of for example from about 0.01 to 1 to about 1 to 1. Somewhat higher ratios of the promoter component may, however, be employed within the scope of the invention. Comprised in the suitable catalysts are the copper-chromium oxide mixtures referred to in the industry as copper chromite, and as "Adkins catalysts." Suitable methods of preparing the latter type of catalyst are disclosed in Organic Synthesis, vol. XIX, page 31, John Wiley and Sons, N.Y. (1939). The catalysts may be used as such or supported upon a suitable inert, solid support material, such as, for example, crushed brick, silicon carbide, etc.

The process of the invention is executed at a temperature above about 130° C. but below 200° C. A temperature in the range of from about 160° to about 180° C. is preferred. The selective formic acid decomposition is carried out at atmospheric, super-atmospheric or sub-atmospheric pressures. In general it is preferred to carry out the process at pressures ranging from about atmospheric to about 25 p.s.i.g. Higher or lower pressures may however be employed within the scope of the invention. The space velocity preferably employed may vary considerably within the scope of the invention depending upon the specific temperature used. In general it is found that a space velocity of at least 4 liters of liquid feed per liter of catalyst per hour is satisfactory.

Under the above-defined conditions formic acid is selectively decomposed to products consisting essentially of $CO_2$ and $H_2$, in the presence of organic components comprising acetic acid, hydrocarbons, water, etc.

The following examples are illustrative of the invention:

EXAMPLE I

In a plurality of separate operations feed mixtures containing acetic and formic acid, were passed through a preheater, heated with boiling chlorobenzene, into a tubular reactor containing a catalyst consisting essentially of chromium oxide, copper oxide and barium oxide. The composition of the feed, and of the catalyst as well as the temperature and space velocity (liters of liquid feed per liter of catalyst per hour) employed in each operation are indicated in the following Table I. The reactor effluence consisting essentially of $CO_2$, $H_2$, acetic acid, water vapor and organic components, was passed through a condenser. The liquid condensate so obtained was then analyzed. Results obtained are set forth in the following Table I for each of the operations.

The $^{13}CO_2$ content of the $CO_2$ obtained via $BaCO_3$ was again found to be 1.107 mol percent, from which it is concluded that under the test conditions of the invention acetic acid does not decompose to any identifiable extent.

The invention claimed is:

1. The process for selectively removing formic acid from mixtures containing said formic acid in admixture with oxygen-containing organic compounds consisting essentially of acetic acid and lower boiling aliphatic and aromatic hydrocarbons, which comprises contacting said mixture in the vapor phase at a temperature of from about 130° to about 200° C., with a catalyst consisting essentially of chromium oxide and copper oxide, said catalyst having an atomic ratio of copper to chromium in the range of from about 0.5 to about 1, thereby selectively decomposing said formic acid.

2. The process for selectively removing formic acid from mixtures containing said formic acid in admixture with acetic acid which comprises contacting said mixture in the vapor phase at a temperature of from about 130° to about 200° C., with a catalyst consisting essentially of chromium oxide and copper oxide, said catalyst

Table I

| Atomic Ratio Ba:Cr:Cu in Cat. | Composition Feed in Percent by Weight | | | | | | Space Velocity, l./l.h. | Temp. in ° C. | FA Decomposed in Percent | AA Decomposed in Percent | p-DIPB Decomposed in Percent |
|---|---|---|---|---|---|---|---|---|---|---|---|
| | AA | FA | p-DIPB | FAl | MA | $H_2O$ | | | | | |
| 1.5:13:10 | 84.6 | 3.88 | | | | 11.5 | 5.8 | 155 | 50 | 0 | |
| 1.5:13:10 | 84.6 | 3.88 | | | | 11.5 | 5.8 | 170 | 78 | 0 | |
| 1.5:13:10 | 84.6 | 3.88 | | | | 11.5 | 5.9 | 180 | 86 | 0 | |
| 1.5:13:10 | 85.0 | 4.14 | | | | 10.9 | 6.0 | 170 | 68 | 0 | |
| 1.5:13:10 | 82.4 | 4.1 | | | | 10.3 | 4.9 | 172 | 72 | 0 | 0 |
| 0:10:10 | 81.2 | 3.97 | 3.0 | 0.58 | 0.3 | 10.95 | 6.2 | 174 | 67 | 0 | 0 |

AA=acetic acid; FA=formic acid; p-DIPB=para-di-isopropyl benzene; MA=methyl acetate; FAl=formaldehyde.

The following example is illustrative of the high degree of selectivity of the process of the invention.

EXAMPLE II (A) A mixture of acetic acid and water containing 91.11% by weight of acetic acid was passed over a copper oxide-chromium oxide-barium oxide-containing catalyst (atomic ratio Ba:Cr:Cu=1.5:13:10) at 170° C. and at a space velocity of approximately 5. No gas evolution was observed, and the composition of the resultant liquid product was substantially the same as that of the starting mixture.

(B) A mixture comprising 84.6% by weight of acetic acid, 3.88% by weight of formic acid and 11.5% by weight of water was passed over the catalyst referred to under (A) at 170° C. and at an LHSV of 4.3. The gaseous products were led through barytes water, after which the resultant $BaCO_3$ was separated and then treated with HCl. Of the $CO_2$ formed from the $BaCO_3$ the $^{13}CO_2$ content was determined by means of mass spectography. This was found to be 1.107 mol percent. (The normal $^{13}CO_2$ content of $CO_2$ is 1.107, approximately 0.004 mol percent.)

The operation was repeated, the only difference being that in this case the starting mixture contained instead of normal acetic acid the same quantity of an acetic acid the content of the $^{13}C$ compound of which was 1.6 mol percent.

having an atomic ratio of copper to chromium in the range of from about 0.5 to about 1, thereby selectively decomposing said formic acid.

3. The process in accordance with claim 2 wherein said catalyst contains barium oxide.

4. The process in accordance with claim 2 wherein said catalyst contains barium oxide in an amount resulting in an atomic ratio of barium to copper of from about 0.01 to 1 to about 1 to 1.

5. The process in accordance with claim 2 wherein said mixture containing formic acid and acetic acid is an aqueous mixture.

6. The process in accordance with claim 2 wherein said mixture is passed over said catalyst at a temperature of from about 160° to about 180° C.

7. The process in accordance with claim 2 wherein said mixture is passed over said catalyst at a space velocity above about 4 liters of liquid feed per liter of catalyst per hour.

References Cited in the file of this patent

UNITED STATES PATENTS 2,656,379    MacKenzie et al. _____ Oct. 20, 1953

OTHER REFERENCES

Sabatier et al.: Chem. Abs., vol. 6, p. 619 (1912).
Chistov et al.: Chem. Abs., vol. 39, p. 879, (1941).